United States Patent
Mita et al.

(10) Patent No.: US 10,596,737 B2
(45) Date of Patent: Mar. 24, 2020

(54) MOLDED ARTICLE AND MOLDING METHOD THEREOF

(71) Applicant: Panasonic Corporation, Kadoma-shi, Osaka (JP)

(72) Inventors: Yuki Mita, Nara (JP); Shouma Nishino, Osaka (JP); Hideo Mine, Nara (JP); Masashi Hamabe, Osaka (JP); Toshifumi Nagino, Osaka (JP)

(73) Assignee: PANASONIC CORPORATION, Osaka (JP)

( * ) Notice: Subject to any disclaimer, the term of this patent is extended or adjusted under 35 U.S.C. 154(b) by 119 days.

(21) Appl. No.: 15/842,337

(22) Filed: Dec. 14, 2017

(65) Prior Publication Data
US 2018/0257277 A1 Sep. 13, 2018

(30) Foreign Application Priority Data
Mar. 13, 2017 (JP) .................. 2017-046852

(51) Int. Cl.
*B29C 45/14* (2006.01)
*C08J 5/04* (2006.01)
(Continued)

(52) U.S. Cl.
CPC ........ *B29C 45/14811* (2013.01); *B29B 15/12* (2013.01); *B29C 45/0005* (2013.01);
(Continued)

(58) Field of Classification Search
CPC .................. B29C 2945/76859; B29C 45/0005
See application file for complete search history.

(56) References Cited

U.S. PATENT DOCUMENTS

| 5,122,021 A | 6/1992 | Medal |
| 5,489,631 A | 2/1996 | Dubois |

(Continued)

FOREIGN PATENT DOCUMENTS

| EP | 0771642 | 5/1997 |
| JP | 2002-307568 A | 10/2002 |

(Continued)

OTHER PUBLICATIONS

Machine translation JP2007-160683 (Year: 2007).*

(Continued)

*Primary Examiner* — Alexander F Ferre
(74) *Attorney, Agent, or Firm* — Hamre, Schumann, Mueller & Larson, P.C.

(57) ABSTRACT

A molded article 1 is made of a resin material 3 containing cellulose fibers 2. The molded article 1 has a surface portion 4 that is in a range satisfying $T_F \leq 0.1 \times T$ where T is the thickness of the molded article 1 and $T_F$ is a distance from the surface of the molded article 1, and the molded article 1 satisfies $D_F \geq 1.1 \times D$ where D is an average cellulose concentration of the overall molded article 1 and $D_F$ is an average cellulose concentration of the surface portion 4. Thus, the molded article suppresses an increase in bending modulus while considerably improving a tensile modulus.

4 Claims, 8 Drawing Sheets

(51) Int. Cl.
  *B32B 23/08* (2006.01)
  *B32B 15/12* (2006.01)
  *B29B 15/12* (2006.01)
  *B29C 45/00* (2006.01)
  *B29C 45/73* (2006.01)
  *B29K 309/08* (2006.01)
  *B29K 201/00* (2006.01)
  *B29K 105/12* (2006.01)
  *B29L 23/00* (2006.01)
  *B29C 45/78* (2006.01)

(52) U.S. Cl.
  CPC .......... *B29C 45/0025* (2013.01); *B29C 45/73* (2013.01); *B32B 23/08* (2013.01); *C08J 5/045* (2013.01); *B29C 45/78* (2013.01); *B29C 2045/7343* (2013.01); *B29C 2945/76531* (2013.01); *B29C 2945/76732* (2013.01); *B29C 2945/76859* (2013.01); *B29K 2105/12* (2013.01); *B29K 2201/00* (2013.01); *B29K 2309/08* (2013.01); *B29K 2995/002* (2013.01); *B29L 2023/00* (2013.01); *C08J 2300/22* (2013.01)

(56) References Cited

U.S. PATENT DOCUMENTS

| | | |
|---|---|---|
| 2005/0019561 A1 | 1/2005 | Gassan et al. |
| 2010/0207071 A1 | 4/2010 | Patham et al. |
| 2011/0028634 A1 | 2/2011 | Isozaki et al. |
| 2013/0022800 A1 | 1/2013 | Hsieh |
| 2014/0024772 A1 | 1/2014 | Marks et al. |

FOREIGN PATENT DOCUMENTS

| | | | |
|---|---|---|---|
| JP | 2006-089517 A | | 4/2006 |
| JP | 2007160683 A | * | 6/2007 |
| JP | 2012-102324 A | | 5/2012 |

OTHER PUBLICATIONS

Extended European Search Report; European Patent Application No. 181585351; dated Jun. 26, 2018 (12 pages).
Grundmann N: "Naturtaserverstarkte Kunststoffe im Automobilienbau", pp. 1-23, XP002683925; Cited in Extended European Search Report.
Debondue E et al.: "La Resistance Mecanique Des Lignes De Soudure De Flux D'Ecoulement Dans Les Pieces Injectees En Composites Thermoplastiques", pp. 47-51, XP000635550; Cited in Extended European Search Report.

* cited by examiner

MOLDED ARTICLE AND MOLDING METHOD THEREOF

FIELD OF THE INVENTION

The present invention relates to a molded article manufactured by injection-molding a resin material containing cellulose, and a molding method thereof.

BACKGROUND OF THE INVENTION

In the related art, molded articles manufactured by injection-molding of resin materials are applicable to products with a high degree of flexibility and thus have been widely used for automobile parts, electrical appliance parts, and other articles for daily use. However, molded articles only made of general-purpose resin materials disadvantageously have low mechanical strength.

For this reason, in some cases, a fibrous filler is used as a material added in order to reinforce general-purpose resin materials. The fibrous filler includes, for example, a glass fiber, a carbon fiber, or a natural fiber. These fibrous fillers have extremely high tensile strength and thus are mixed with general-purpose resin materials to prepare composite resin materials. This can improve the mechanical strength of molded articles or reduce the weights of molded articles.

Materials used as fibrous fillers include a cellulose fiber, a kind of natural fibers. Cellulose fibers can be manufactured using wood and thus are expected to be highly available at low cost. Moreover, cellulose fibers can be easily treated after disposal and can be properly recycled, leading to a light environmental load.

If cellulose fibers are used as filler, ensuring sufficient strength requires a fiber disentangling step in which fibers are finely disentangled from materials such as wood pulp, and a step of dispersing fibers into a resin material. In the dispersing step, unfortunately, cellulose fibers with a hydrophilic base are difficult to disperse in a resin material.

Thus, in JP2012-102324A, a specific disperser is mixed in a resin material and cellulose fibers, thereby properly dispersing the cellulose fibers. The disperser contains a disperser having a hydroxyl value of at least 30 mgKOH/g. The disperser preferably has a concentration of 2 to 10 mass %. With this configuration, cellulose fibers are properly dispersed into a resin material, achieving a molded article with high mechanical strength, e.g., high tensile strength or a high bending modulus. Furthermore, with this configuration, an injection-molded article can be obtained with high injection moldability and a proper external appearance.

DISCLOSURE OF THE INVENTION

However, a fibrous filler is uniformly dispersed in a molded article of the related art and thus an increase in the content of the fibrous filler simultaneously raises a tensile modulus and a bending modulus. An increase in tensile modulus and bending modulus is desirable for an ordinary structural component. However, in some cases, a high tensile modulus and a low bending modulus may be desirable.

For example, in a cylindrical structure that receives an internal pressure, a high tensile modulus is required in order to reduce a change in outside dimensions by suppressing deformation caused by a change in the internal pressure. If both ends of the cylindrical structure are fixed, a load is applied to the fixed both ends of the cylindrical structure due to a difference in thermal expansion as temperature changes. This may break the fixed ends. At this point, a break on the fixed ends can be prevented as the cylindrical structure is bent and deformed so as to absorb the difference in thermal expansion. In this case, a flexible material having a low bending modulus is desirable.

As has been discussed, in the configuration of the related art, if a high tensile modulus and a low bending modulus are desirable, unfortunately, it is difficult to obtain a desired molded article.

The present invention has been devised to solve the problem of the related art. An object of the present invention is to provide a molded article obtained by injection molding a composite resin material containing cellulose fibers as a fibrous filler. In the molded article, in comparison with a molded article only made of a general-purpose resin material, an increase in bending modulus is suppressed while a tensile modulus is considerably improved.

In order to attain the object, a molded article of the present invention is a molded article made of a resin material containing cellulose fibers, wherein the molded article has a surface portion that is in a range satisfying $T_F \leq 0.1 \times T$ where T is the thickness of the molded article and $T_F$ is a distance from the surface of the molded article, and the molded article satisfies $D_F \geq 1.1 \times D$ where D is the average cellulose concentration of the overall molded article and $D_F$ is the average cellulose concentration of the surface portion.

The molded article of the present invention contains cellulose fibers and thus can considerably improve a tensile modulus in comparison with a molded article only made of a general-purpose resin material. Moreover, the average cellulose concentration of the surface portion is higher than the cellulose concentration of a portion (central portion) other than the surface portion, and the thickness of the surface portion is quite smaller than that of the overall molded article. Thus, the molded article can be obtained while suppressing an increase in the bending modulus of the overall molded article.

DESCRIPTION OF THE EMBODIMENTS

Embodiments of the present invention will be described below with reference to the accompanying drawings.

First Embodiment

Figure 1:
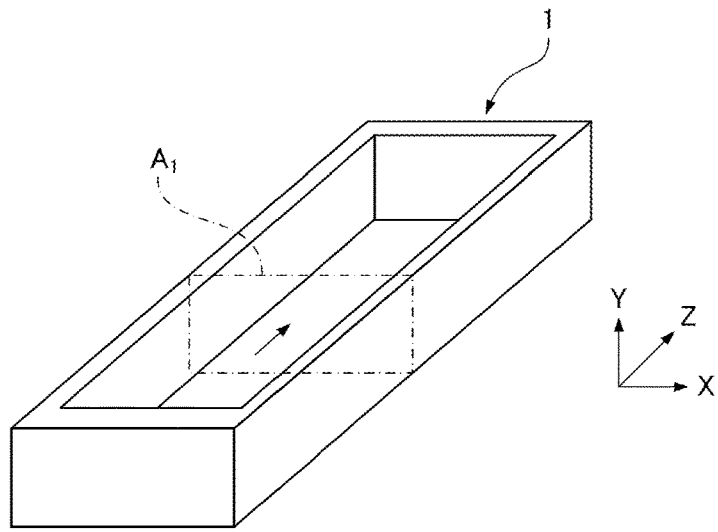
FIG. 1 is a perspective view showing a molded article according to a first embodiment of the present invention.
Figure 2:
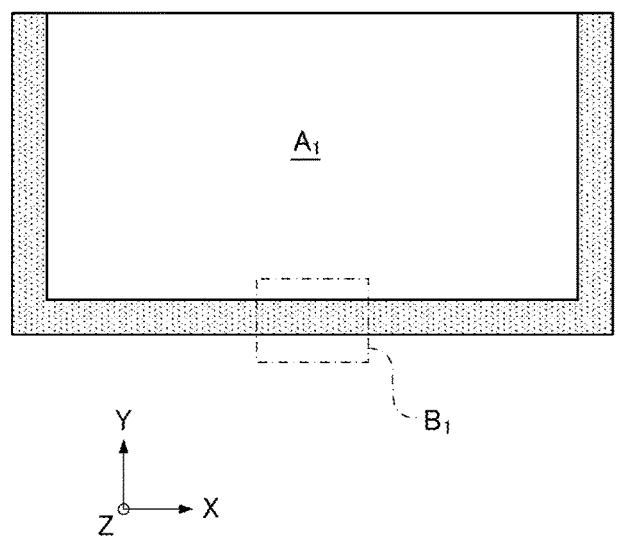
FIG. 2 shows a cross section $A_1$ of the molded article in FIG. 1.
Figure 3:
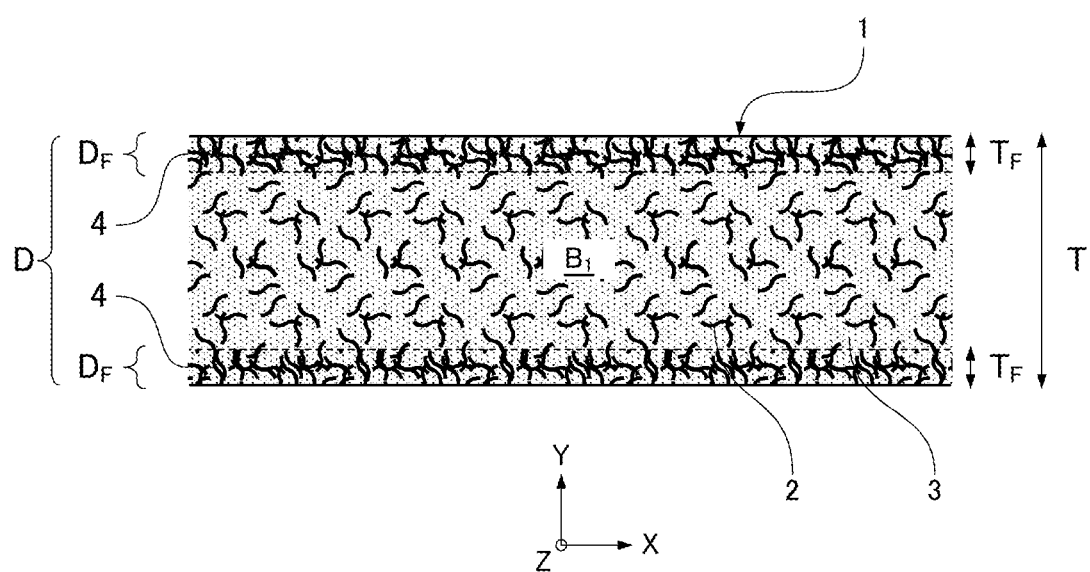
FIG. 3 is an enlarged cross-sectional view of the molded article, that is, an enlarged view of $B_1$ in FIG. 2.

FIG. 1 is a perspective view schematically showing a molded article 1 according to a first embodiment of the present invention. FIG. 2 is a cross-sectional view showing the molded article 1 according to the first embodiment of the present invention (a cross section $A_1$ viewed in the direction of an arrow in FIG. 1). FIG. 3 is an enlarged cross-sectional view showing the molded article 1 according to the first embodiment of the present invention (an enlarged view of $B_1$ in FIG. 2). In FIGS. 1 to 3, the same constituent elements are indicated by the same reference numerals.

As shown in FIGS. 1 and 2, the molded article 1 is shaped like a box with one opened side. As shown in FIG. 3, the molded article 1 is made of a resin material 3 containing dispersed cellulose fibers 2. FIG. 3 is a conceptual diagram in which the dimensions of the cellulose fibers 2 are different from actual reduction scales. Referring to FIG. 3, the distribution of the cellulose fibers 2 will be more specifically described below. In FIGS. 1 to 3, the X direction is parallel to the bottom of a box structure, the Y direction (thickness direction) is perpendicular to the bottom of the box structure, and the Z direction is perpendicular to both of the X direction and the Y direction.

The thickness of the molded article 1 is denoted as T. A surface portion 4 is in a range satisfying $T_F \leq 0.1 \times T$. $T_F$ denotes a distance from one surface of the molded article 1 and a distance from the other surface of the molded article 1. In other words, the surface portion 4 includes an external appearance and the vicinity of the appearance on one surface and the other surface of the molded article 1.

The cellulose fibers 2 are dispersed in the resin material 3 when it is in the form of resin pellets (before being melted for injection molding). As a result of flowing of the cellulose fibers at injection molding and insufficient dispersion of the cellulose fibers in pellets, and so on, the density of the cellulose fibers 2 is not always kept constant in the cross section of the molded article 1.

The average cellulose concentration of the overall molded article 1 is denoted as D. D expressed in mass % is determined by dividing the total mass of the cellulose fibers 2 contained in the molded article 1 by the mass of the overall molded article 1.

The average cellulose concentration of the surface portion 4 is similarly denoted as $D_F$. In the relationship of the average cellulose concentration, the molded article 1 of the present embodiment satisfies $D_F \geq 1.1 \times D$, preferably $D_F \geq 1.2 \times D$, and more preferably $D_F \geq 1.5 \times D$.

In other words, the average cellulose concentration $D_F$ of the surface portion 4 is higher than the average cellulose concentration D of the overall molded article 1. Or to put it another way, the cellulose fibers 2 are concentrated on the surface of the molded article 1, whereas the density of the distributed cellulose fibers 2 is slightly lower in a portion other than the surface portion (central portion).

In this configuration, examples of the cellulose fibers 2 include pulp, cellulose nanofibers, lignocellulose, lignocellulose nanofibers, a fibrous filler of cotton, hemp, jute fibers, and the like, and modified fibers that are chemically modified on the surfaces and/or ends of the cellulose fibers 2. The cellulose fibers 2 may contain multiple fibrous fillers selected from these fibers.

In order to ensure high moldability, a thermoplastic resin is used as the resin material 3. The thermoplastic resin is, for example, an olefin resin (including a cyclic olefin resin), a styrene resin, a (meta)acrylic resin, an organic vinyl ester resin or a derivative thereof, a vinyl ether resin, a halogen-containing resin, a polycarbonate resin, a polyester resin, a polyamide resin, a thermoplastic polyurethane resin, a polysulfone resin (e.g., polyether sulfone or polysulfone), a polyphenylene ether resin (e.g., 2,6-xylenol polymer), a cellulose derivative (e.g., cellulose esters, cellulose carbamates, or cellulose ethers), a silicone resin (e.g., dimethylpolysiloxane or polymethylphenyl siloxane), or rubber or an elastomer (e.g., diene rubbers such as polybutadiene or polyisoprene, a styrene-butadiene copolymer, an acrylonitrile-butadiene copolymer, acrylic rubber, urethane rubber, or silicone rubber). At least one of the resins can be used singly or in combinations of two or more. The resin material 3 is not limited to these materials as long as thermoplasticity is provided.

Of these thermoplastic resins, the resin material 3 is preferably an olefin resin having a relatively low melting point. Examples of the olefin resins include a copolymer of olefin monomers and a copolymer of olefin monomers and other copolymerizable monomers in addition to a monopolymer of an olefin monomer.

Olefin monomers include, for example, chain olefins (α-C2-20 olefins such as ethylene, propylene, 1-butene, isobutene, 1-pentene, 4-methyl-1-pentene, and 1-octene) and cyclic olefins. At least one of the olefin monomers can be used singly or in combinations of two or more. Of the olefin monomers, chain olefins such as ethylene and propylene are preferable.

Examples of other copolymerizable monomers include, for example, fatty acid vinyl esters such as vinyl acetate and vinyl propionate; (meta)acrylic monomers such as (meta)acrylic acid, alkyl (meta)acrylate, and glycidyl (meta)acrylate; unsaturated dicarboxylic acids such as maleic acid and fumaric acid, or an anhydride of the unsaturated dicarboxylic acids such as maleic anhydride; a vinyl ester of carboxylic acid (e.g., vinyl acetate or vinyl propionate); cyclic olefins such as norbornene and cyclopentadiene; and dienes such as butadiene and isoprene. At least one of the copolymerizable monomers can be used singly or in combinations of two or more.

Specific examples of olefin resins include copolymers of chain olefins (particularly α-C2-4 olefin) including polyethylene (a low density, medium density, high density or linear low-density polyethylene), polypropylene, an ethylene-propylene copolymer, and a terpolymer such as ethylene-propylene-butene-1.

A method of manufacturing the molded article 1 having the fiber distribution of FIG. 3 will be described below. Composite resin pellets made of the resin material 3 containing the dispersed cellulose fibers 2 are charged into an injection molding machine and are melted therein. The melted pellets are then charged into molding dies to mold the molded article 1. Specifically, the temperature of the composite resin pellets charged into the injection molding machine are raised to at least the melting point of the resin material 3, and then the molding dies are filled with the liquefied pellets containing the cellulose fibers 2. When shape portions for the molded article 1 in the molding dies is completely filled with the liquid, the charging is completed. In the molding dies, the liquefied resin material 3 exchanges heat with the molding dies so as to solidify at the melting point or lower. The solidification of the resin material 3 is started from the surface portion of the molded article 1 while the molding dies are in contact with the surface portion. The resin material 3 then solidifies sequentially to a portion (central portion) other than the surface portion of the molded article 1. After that, the molding dies are cooled and then the molded article 1 is removed. Heat exchange with the resin material 3 applies heat to the molding dies.

The molding method of the molded article of the present embodiment features cooling of the molding dies before the completion of charging of the resin material 3, for example, at the start of charging or during charging. In other words, an amount of heat released from the molding dies is larger than an amount of heat applied to the resin material 3. Thus, the mean temperature of the total volume of the molding dies (hereinafter, may be simply referred to as a mean temperature) at the completion of charging of the resin material 3 is set lower than the mean temperature of the molding dies at the start of charging of the resin material 3. After the molded article 1 is removed, the temperature of the dies is increased again to perform the subsequent injection molding.

This method increases the cooling speed of the surface portion 4 of the molded article 1. The molten resin material 3 has a high-density part containing the high-density cellulose fibers 2 and a low-density part containing the low-density cellulose fibers 2. The high-density part and the low-density part flow in convection. As the high-density part approaches the surface portion 4, the high-density part is more likely to coagulate while the low-density part is unlikely to coagulate and keeps flowing in convection. Generally, the thermal conductivity of the cellulose fibers 2 is higher than that of the resin material 3 and thus the high-density part containing the high-density cellulose fibers 2 preferentially exchanges heat with the molding dies. In other words, the high-density part containing the high-density cellulose fibers 2 is likely to concentrate in the surface portion 4. Thus, as shown in FIG. 3, the cellulose concentration $D_F$ of the surface portion 4 is set higher than the average cellulose concentration D of the overall molded article 1.

A high cellulose concentration on the surface increases the visibility of cellulose coagulation, causing a phenomenon generally called "floating fibers". The floating fibers are frequently treated as a defective phenomenon in an exterior component serving as the appearance of an article. In contrast to the manufacturing method of the present embodiment, in some cases, floating fibers may be eliminated by keeping the molding dies at a high temperature.

However, floating fibers do not cause any problems in components other than exterior components of articles. On exterior components, floating fibers can be made less noticeable by a color combination of the resin material 3 or coloring on the surface of a molded article. Floating fibers can be used as a design by controlling a flow of fibers. Thus, the molded article can be widely used even in the presence of floating fibers.

The strength characteristics of the molded article 1 produced thus will be described below. The molded article 1 has a cross section as shown in FIG. 3. In the Y direction of FIG. 3, that is, the thickness direction of the molded article 1, a cellulose concentration sequentially changes to a high concentration, a low concentration, and a high concentration from one surface to the other surface of the molded article. In a YZ cross section (a cross section perpendicular to the X direction) of FIG. 3, that is, in a cross section in the thickness direction, an average cellulose concentration is close to the average cellulose concentration D of the overall molded article 1. Regarding an XZ cross section (a cross section perpendicular to the Y direction), a cellulose concentration is high over the XZ cross section of the surface portion 4, whereas a cellulose concentration is low over the XZ cross section of a portion other than the surface portion.

When a cellulose concentration is increased in a portion of the molded article 1, a tensile modulus and a bending modulus are improved in the portion of the molded article 1. In other words, a tensile modulus and a bending modulus considerably increase in the surface portion 4 having a high cellulose concentration, whereas a tensile modulus and a bending modulus do not considerably increase in a portion other than the surface portion.

The strength of the molded article 1 of the present embodiment will be described below in comparison with uniform fiber distribution for improving a tensile modulus and a bending modulus. First, the application of a tensile load in the X direction of FIG. 3 will be discussed below. At this point, a cellulose concentration may fluctuate but an average cellulose concentration in a Y cross section is close to the average cellulose concentration D of the overall molded article 1. In other words, the tensile modulus of the molded article 1 with a tensile load applied in the X direction substantially equally improves in the present embodiment and in uniform fiber distribution.

The application of a bending load to the molded article 1 will be examined below. In the case of uniform fiber distribution, a cellulose concentration in an X cross section is close to the average cellulose concentration D of the molded article 1. This improves the bending modulus of the overall molded article 1. In the present embodiment, the surface portion 4 has a high bending modulus but a bending modulus is not considerably improved in a portion (central portion) other than the surface portion. The surface portion 4 having an extremely small thickness is likely to be structurally bent and deformed. Thus, an increase in the bending modulus of the molded article 1 with an applied bending load is smaller than that of uniform fiber distribution.

Hence, in comparison with a molded article only made of a general-purpose resin material, the molded article 1 of the present embodiment can suppress an increase in bending modulus while considerably improving a tensile modulus. The molding method of the molded article according to the present embodiment can facilitate manufacture of a molded article so as to suppress an increase in bending modulus while considerably improving a tensile modulus, as compared with a molded article only made of a general-purpose resin material.

The molded article 1 manufactured thus has a high tensile modulus and thus is hardly extended by a tensile load. Hence, the present invention is useful for articles where a dimensional change is not desirable. Moreover, an increase in bending modulus is suppressed and thus the present invention is useful for relatively flexible articles that are advantageously soft to a person.

The molded article 1 of the present embodiment includes the surface portion 4 having a particularly high cellulose concentration. This improves surface resistance to scratches and resistance to wear as compared with uniform dispersion of cellulose. Hence, the present invention is particularly useful for articles repeatedly touched by persons.

Second Embodiment

Figure 4:
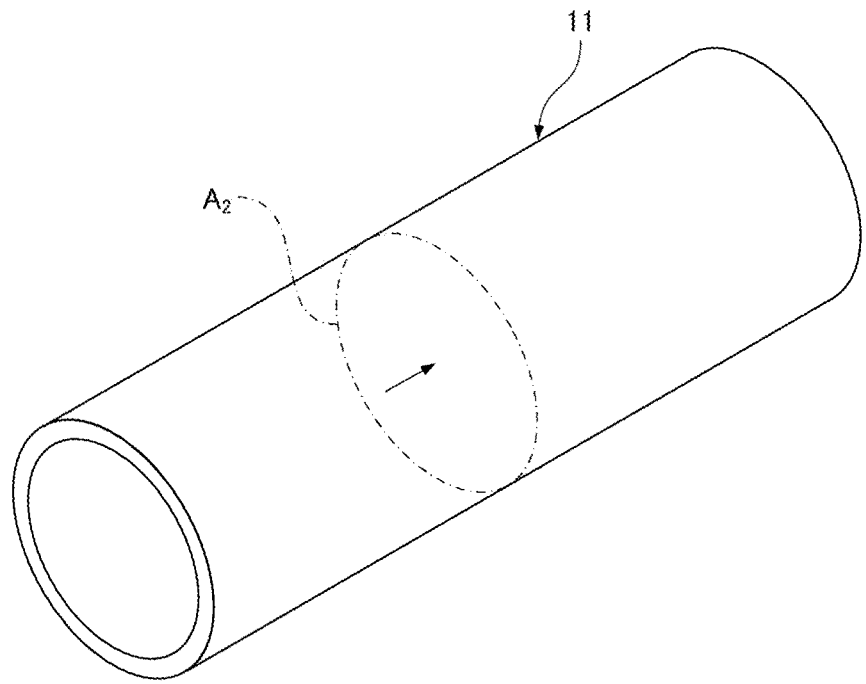
FIG. 4 is a perspective view showing a molded article according to a second embodiment of the present invention.
Figure 5:
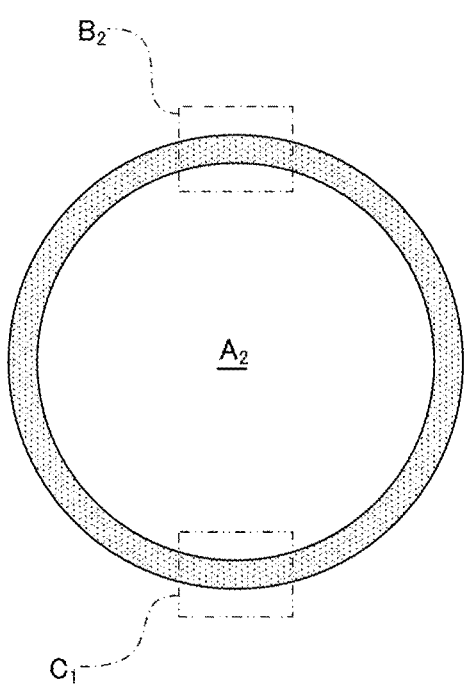
FIG. 5 shows a cross section $A_2$ of the molded article in FIG. 4.
Figure 6:
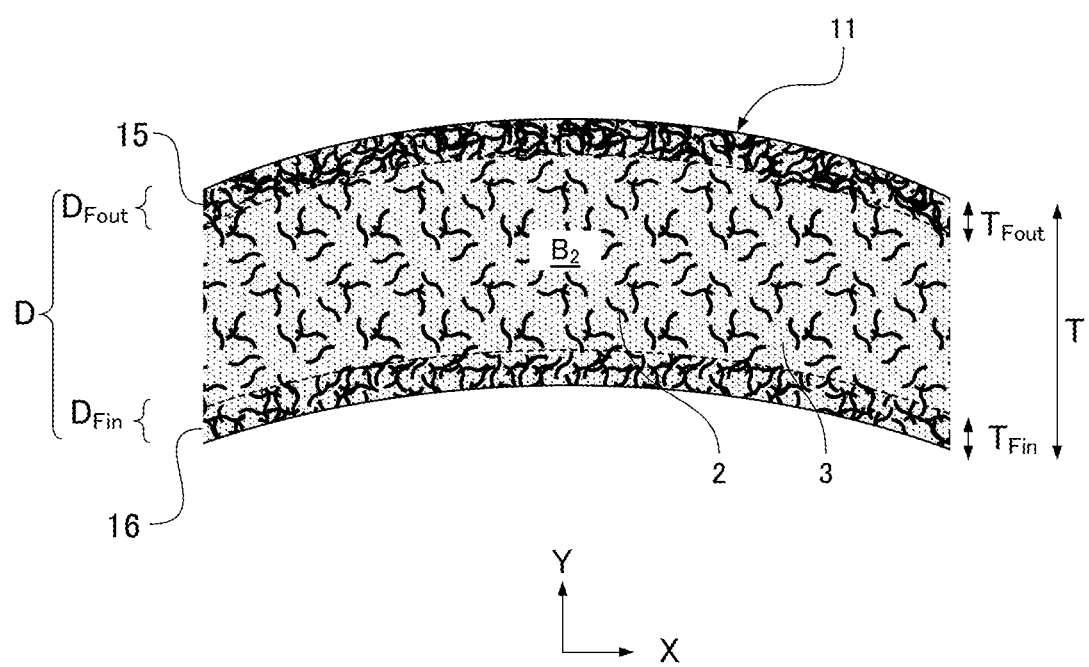
FIG. 6 is an enlarged cross-sectional view of the molded article, that is, an enlarged view of $B_2$ in FIG. 5.

FIG. 4 is a perspective view schematically showing a molded article 11 according to a second embodiment of the present invention. FIG. 5 is a cross-sectional view showing the molded article 11 according to the second embodiment of the present invention (a cross section $A_2$ viewed in the direction of an arrow in FIG. 4). FIG. 6 is an enlarged cross-sectional view showing the molded article 11 according to the second embodiment of the present invention (an enlarged view of $B_2$ in FIG. 5). In FIGS. 4 to 6, the same constituent elements as those of FIGS. 1 to 3 are indicated by the same reference numerals and a detailed explanation thereof is omitted.

As shown in FIGS. 4 and 5, the molded article 11 is shaped like a cylinder that is annularly closed in cross section. As shown in FIG. 6, the molded article 11 is made of a resin material 3 containing dispersed cellulose fibers 2. FIG. 6 is a conceptual diagram in which the dimensions of the cellulose fibers 2 are different from actual reduction scales. Referring to FIG. 6, the distribution of the cellulose fibers 2 will be more specifically described below. In FIG. 6, the X direction is the circumferential direction (tangential direction) of a cylindrical structure and the Y direction is a radial direction (thickness direction) of the cylindrical structure.

The thickness of the molded article 11 is denoted as T. An outer surface portion 15 is in a range satisfying $T_{Fout} \leq 0.1 \times T$. $T_{Fout}$ denotes a distance from the outer surface of the molded article 11. An inner surface portion 16 is in a range satisfying $T_{Fin} \leq 0.1 \times T$. $T_{Fin}$ denotes a distance from the inner surface of the molded article.

The outer surface portion 15 is a main external appearance of the cylindrical molded article 11. In the presence of a material that flows inside the molded article 11 or is stored in the molded article 11, the inner surface portion 16 is a main contact part with the material. The average cellulose concentration of the overall molded article 11 is denoted as D. The average cellulose concentration of the outer surface portion 15 is denoted as $D_{Fout}$, and the average cellulose concentration of the inner surface portion 16 is denoted as $D_{Fin}$.

In the relationship of the average cellulose concentration, the molded article 11 of the present embodiment satisfies $D_{Fout} > D_{Fin} \geq 1.1 \times D$, preferably $D_{Fout} > D_{Fin} \geq 1.2 \times D$, and more preferably $D_{Fout} > D_{Fin} \geq 1.5 \times D$. In other words, the average cellulose concentration $D_{Fout}$ of the outer surface portion 15 is particularly high and the average cellulose concentration $D_{Fin}$ of the inner surface portion 16 is the second highest, indicating that $D_{Fout}$ and $D_{Fin}$ are both higher than the average cellulose concentration D of the overall molded article 11. Or to put it another way, the cellulose fibers 2 are concentrated particularly on the outer surface of the molded article 11 and the density of the cellulose fibers 2 is the second highest on the inner surface of the molded article 11. The density of the distributed cellulose fibers 2 is slightly lower in a portion other than the surface portion.

A method of manufacturing the molded article 11 having the fiber distribution of FIG. 6 will be described below. Injection molding is mainly performed by the same method as in the first embodiment. In this case, a molding die includes an outer die that comes into contact with the outer surface portion 15 and an inner die that comes into contact with the inner surface portion 16. The inner and outer dies are both cooled before the completion of charging of the resin material. At this point, the mean temperature of the inner die is always set higher than that of the outer die from the start to completion of charging of the resin material.

Specifically, such a temperature condition is obtained by raising the mean temperature of the inner die before the start of charging to a temperature higher than that of the outer die and starting cooling of the outer die earlier than that of the inner die if the inner die and the outer die are cooled substantially at the same speed.

Thus, in the molded article 11, the outer surface portion 15 is cooled at the highest speed and the cellulose concentration $D_{Fout}$ of the outer surface portion 15 is particularly increased. The inner surface portion 16 is cooled at the second highest speed so as to increase the cellulose concentration $D_{Fin}$. Both of $D_{Fout}$ and $D_{Fin}$ can be higher than the average cellulose concentration D of the overall molded article 11.

The strength characteristics of the molded article 11 produced thus will be described below. As in the first embodiment, the molded article 11 of the second embodiment has a high tensile modulus in the X direction of FIG. 6 and suppresses an increase in bending modulus.

For example, if an inclusion in the cylindrical molded article 11 is a high-pressure fluid, the molded article 11 is expanded by an internal pressure. At this point, a tensile modulus is increased so as to suppress a dimensional change in the molded article 11. Since the outer surface portion 15 has a high tensile modulus, a change in outside dimensions is particularly suppressed. This is useful for placing the molded article 11 in a small space.

For example, if the cylindrical molded article 11 contains a high-temperature inclusion, the temperature of the molded article 11 may be increased. The molded article 11 is to be extended by thermal expansion. If both ends of the molded article 11 are fixed, a load may be applied to fixed portions so as to break the fixed ends. However, an increase in bending modulus is suppressed in the molded article 11 and thus a dimensional change by thermal expansion can be absorbed by bending deformation. This can prevent a break on the fixed ends of the molded article 11.

Thus, in comparison with a molded article only made of a general-purpose resin material, the molded article 11 of the second embodiment suppresses an increase in bending modulus while considerably improving a tensile modulus. This can reduce a change in outside dimensions particularly in response to an internal pressure and absorb a dimensional change, which is caused by thermal expansion, through bending deformation. In comparison with a molding method for molding a molded article only made of a general-purpose resin material, the molding method for molding the molded article according to the second embodiment can facilitate manufacture of the molded article with a small change in outside dimensions in response to an internal pressure so as to suppress an increase in bending modulus while considerably improving a tensile modulus.

The molded article 11 produced thus is particularly useful for a pipe component that contains a high-temperature and a high-pressure fluid with fixed both ends. In FIGS. 4 to 6, the molded article 11 is a cylinder that is circular in cross section. The molded article of the second embodiment is not limited to this configuration. For example, the molded article is useful for an elliptic cylinder that is elliptic in cross section, a polygonal cylinder that is shaped like a polygonal ring in cross section, or other odd shapes.

Figure 7:
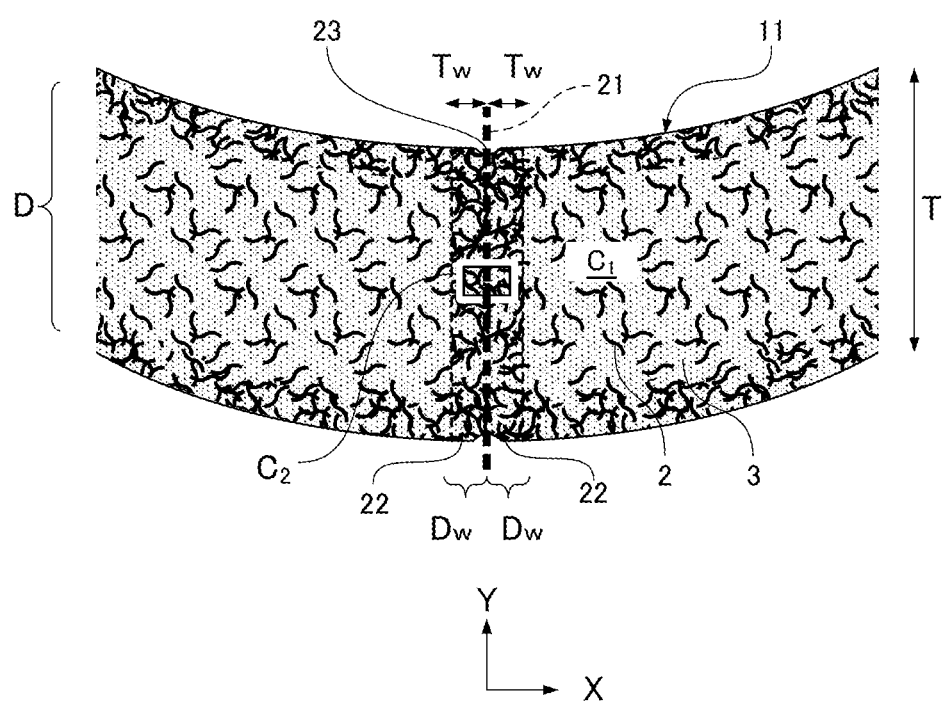
FIG. 7 is an enlarged cross-sectional view of the molded article, that is, an enlarged view of $C_1$ in FIG. 5.

A more preferable configuration of the molded article and a method of manufacturing the same will be described below according to the second embodiment of the present invention. FIG. 7 is an enlarged cross-sectional view of the molded article 11 according to the second embodiment (an enlarged view of $C_1$ in FIG. 5). In FIG. 7, the same constituent elements in FIGS. 4 to 6 are indicated by the same reference numerals and a detailed explanation thereof is omitted.

As shown in FIG. 7, the molded article 11 has a weld line 21 serving as a junction point of resin flows during injection molding. The weld line 21 does not depend on the shape of the molded article but inevitably appears in the annular molded article 11.

A distance from the weld line 21 along the circumferential direction of the annular molded article is denoted as $T_W$. A weld portion 22 is in a range satisfying $T_W \leq 0.1 \times T$ relative to a thickness T of the molded article 11. The weld portion 22 is located on each side of the weld line 21 and is provided for each of the weld lines 21 in the overall molded article 11.

The average cellulose concentration of the weld portion 22 is denoted as $D_W$. The average cellulose concentration of the overall molded article 11 is denoted as D. In this case, in the relationship of the average cellulose concentration $D_W$, the molded article 11 of the present embodiment satisfies $D_W \geq 1.1 \times D$, preferably $D_W \geq 1.2 \times D$, and more preferably $D_W \geq 1.5 \times D$.

In other words, the average cellulose concentration $D_W$ of the weld portion 22 is higher than the average cellulose concentration D of the overall molded article 11. Or to put it another way, the cellulose fibers 2 are concentrated particularly around the weld line 21 of the molded article 11.

In some cases, a weld sink mark 23 appears on each end of the weld line 21 in cross section. In the event of the weld sink mark 23, the thickness T of the molded article 11 is reduced on the weld line 21. The reason for the state will be described below with reference to the drawings.

Figure 8A:
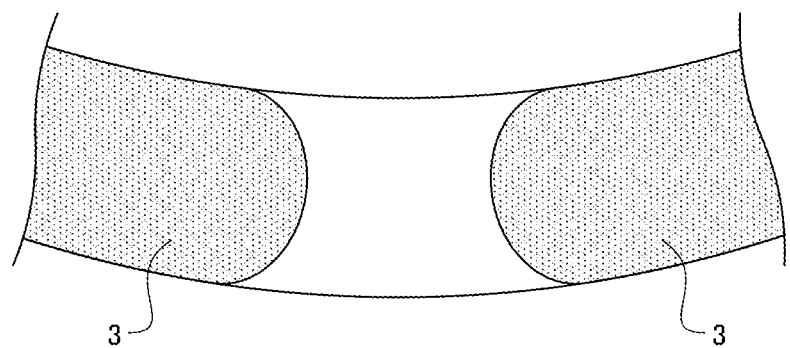
FIG. 8A is an enlarged cross-sectional view showing a molding process of the molded article.
Figure 8B:
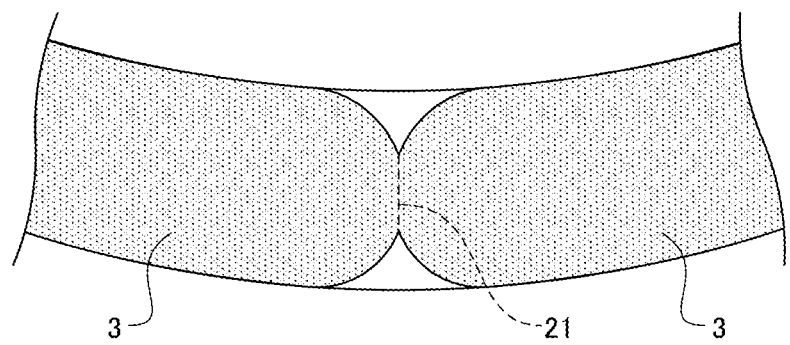
FIG. 8B is an enlarged cross-sectional view showing the molding process of the molded article.
Figure 8C:
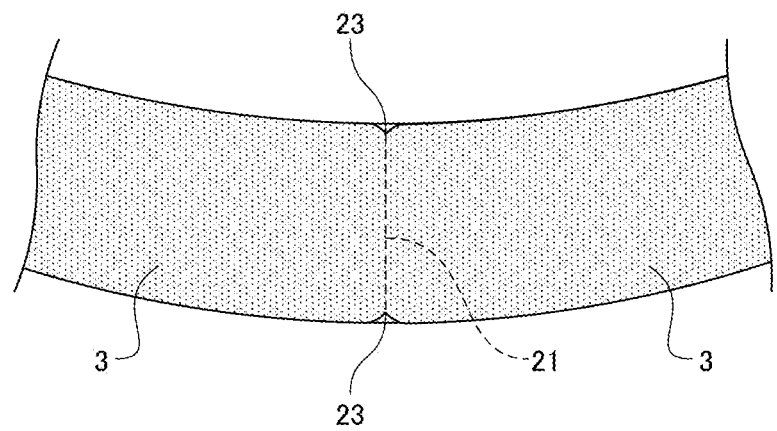
FIG. 8C is an enlarged cross-sectional view showing the molding process of the molded article.

FIGS. 8A to 8C are conceptual diagrams showing a molding process of the molded article according to the second embodiment of the present invention. In FIGS. 8A to 8C, the same constituent elements as those of FIG. 7 are indicated by the same reference numerals and a detailed explanation thereof is omitted. FIGS. 8A to 8C schematically show the steps of joining the resin material 3 in the molding die.

In FIG. 8A, the molten resin material 3 flows in two directions to a junction point in the molding die. In FIG. 8B, the resin material 3 flowing in the two directions starts joining into a single flow. At this point, the junction point serves as the weld line 21.

In FIG. 8C, the resin material 3 further flows to substantially fill a space in the molding die. At this point, the space may not be completely filled with the resin material 3 if the resin material 3 starts coagulating or gas remains in the molding die. The gas in the molding die is, for example, air or gas vaporized from the resin material 3. In this case, the weld sink mark 23 appears on each end of the weld line 21. The weld sink mark 23 can be quite small in size under proper molding conditions.

The end of the flow of the resin material 3 exchanges heat with gas in the molding die. As in the molding method of the first embodiment, the mean temperature of the molding die at the completion of charging of the resin material 3 is set lower than the mean temperature of the molding die at the start of charging of the resin material 3 in the molding method of the present embodiment. Thus, gas is also cooled in the molding die. For this reason, the end of the flow of the resin material 3 is cooled by heat exchange with gas in the molding die so as to be partially coagulated. At this point, as in the first embodiment, a part containing the cellulose fibers 2 with a high density is preferentially coagulated by heat exchange with gas in the molding die.

Figure 9A:
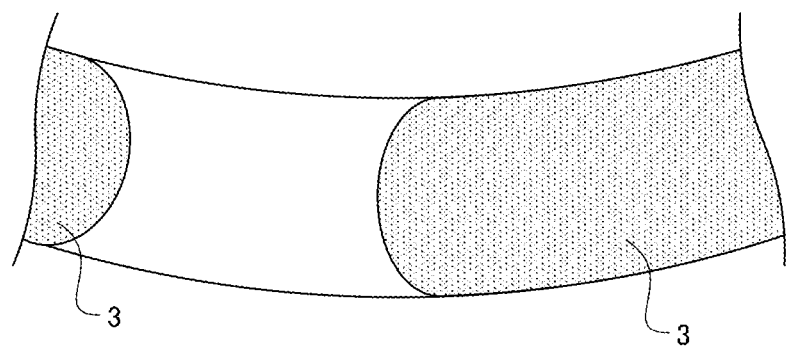
FIG. 9A is an enlarged cross-sectional view showing a molding process of the molded article.
Figure 9B:
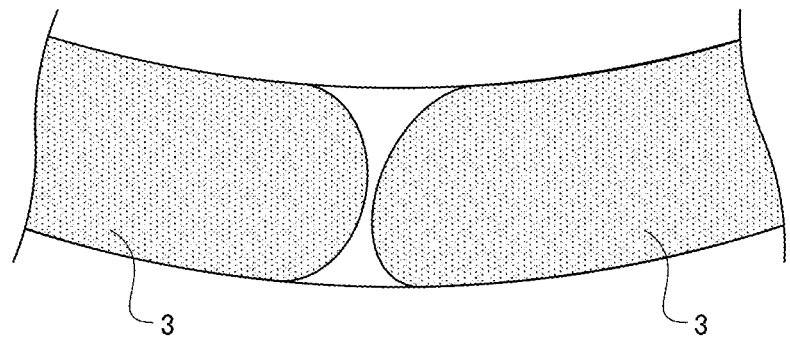
FIG. 9B is an enlarged cross-sectional view showing the molding process of the molded article.
Figure 9C:
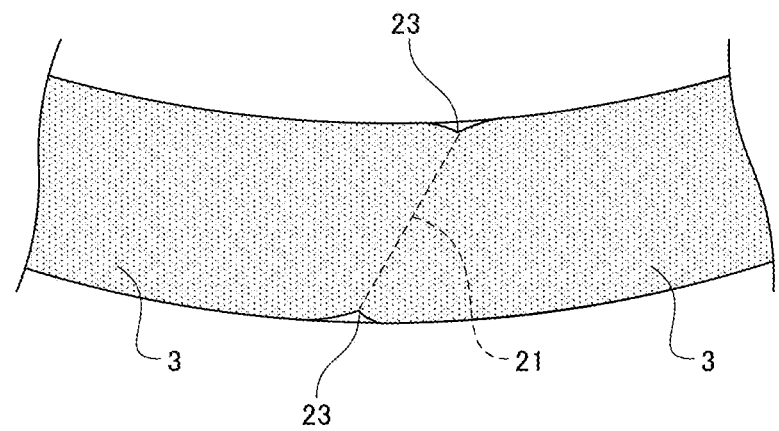
FIG. 9C is an enlarged cross-sectional view showing the molding process of the molded article.

As a result of the flow, as shown in FIG. 7, the weld part has a high cellulose concentration. In FIGS. 8A to 8C, the resin material 3 flowing in the two directions joins substantially at the same speed. Referring to FIGS. 9A to 9C, the resin material 3 joining at different speeds will be discussed below.

In FIG. 9A, the resin material 3 flowing earlier from the right is first cooled by the die over a long distance. Thus, the speed of the flow decreases and then the resin material 3 stops flowing. In FIG. 9B, the resin material 3 subsequently flowing from the left starts coming into contact with the resin material 3 that is almost stopped on the right. At this point, the resin material 3 on the right does not completely coagulate immediately after the stop of the flow. Moreover, the resin material 3 on the right is deformed by the influence of gravity and so on.

In FIG. 9C, the resin material 3 in the two directions joins to form the weld line 21. The weld sink marks 23 may be additionally formed. Also in this case, the weld portion is formed within a certain distance from the weld line 21 as in FIG. 7. The average cellulose concentration $D_W$ of the weld portion is higher than the average cellulose concentration D of the overall molded article 11.

In an ordinary resin molded article, the weld line 21 in FIG. 7 has lower strength than other parts and thus a break is likely to occur from the weld line 21. This is because the weld sink marks 23 on the weld line 21 reduce the thickness of the molded article and the partially coagulated resin material 3 joins so as to reduce a tensile modulus on the weld line 21.

In the molded article 11 of the second embodiment, the average cellulose concentration $D_W$ of the weld portion 22 is higher than the average cellulose concentration D of the overall molded article 11. Thus, even if the molded article has a small thickness on the weld line 21, a reduction in tensile modulus in the X direction of FIG. 7 is suppressed.

Figure 10:
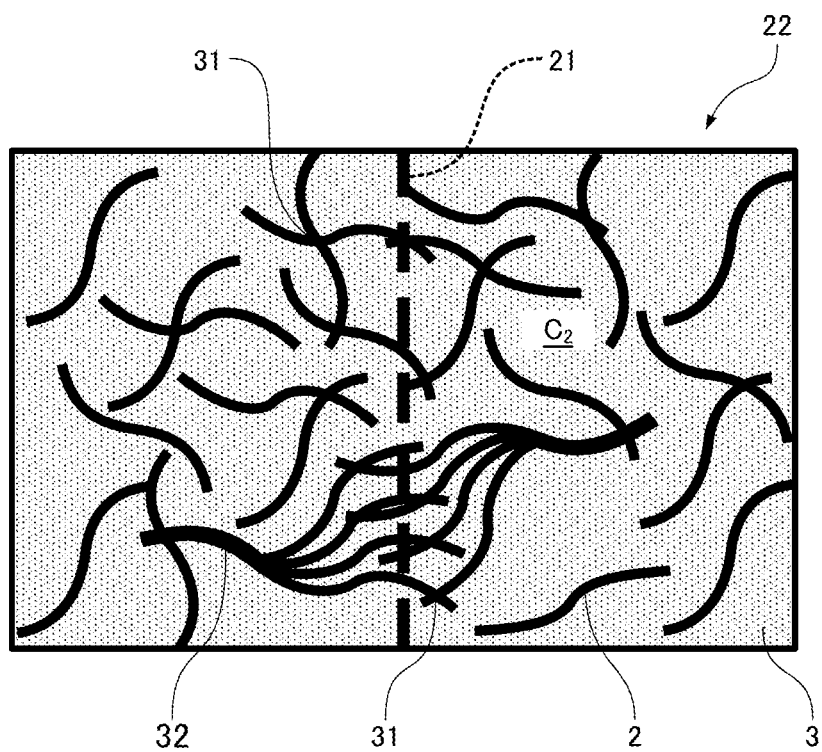
FIG. 10 is an enlarged cross-sectional view of the molded article, that is, an enlarged view of $C_2$ in FIG. 7.

Referring to FIG. 10, a state of the cellulose fibers 2 on the weld line 21 will be described below. FIG. 10 is an enlarged cross-sectional view of a part of the weld portion 22 in the molded article 11 (an enlarged view of $C_2$ in FIG. 7). In FIG. 10, the same constituent elements as those of FIG. 7 are indicated by the same reference numerals and a detailed explanation thereof is omitted.

The weld portion 22 on both sides of the weld line 21 contain the cellulose fibers 2 dispersed in the resin material 3. The cellulose fibers 2 partially protrude from the weld line 21 that served as a surface portion when the resin material 3 flows. The cellulose fibers 2 protruding from both sides of the weld line 21 are entangled with one another so as to form fiber entanglement portion 31.

The cellulose fibers 2 include partly disentangled cellulose fibers 32 that are not completely disentangled and are partially entangled. If the partly disentangled cellulose fibers 32 are located on both sides of the weld line 21, the multiple fiber entanglement portions 31 are formed.

As has been discussed, in the molded article 11 of the present embodiment, the multiple fiber entanglement portions 31 are formed around the weld line 21 (weld portion 22). The cellulose fibers 2 are reinforcement materials that are entangled so as to improve the reinforcement of the fiber entanglement portions 31. On the weld line 21, the partially coagulated resin material 3 joins into a single flow and the multiple fiber entanglement portions 31 suppress a reduction in tensile modulus.

As has been discussed, the molded article 11 of the present embodiment has the weld line 21. The cellulose concentration $D_W$ of the weld portion 22 is higher than the average cellulose concentration D of the overall molded article 11. This can suppress a reduction in tensile modulus on the weld line 21 and prevent a break of the molded article 11. The molded article 11 produced thus suppresses a local reduction in tensile modulus and thus is useful for, for example, a pipe component that uniformly receives an internal pressure.

The present embodiment is the cylindrical molded article 11 having the weld line. The configuration and the manufacturing method are also useful for a molded article that is not cylindrical as in the first embodiment, as long as the molded article has the weld line.

The molded article of the present invention is useful as a molded article for a structure, e.g., automobile parts, electrical appliance parts, and other articles for daily use.

What is claimed is:

1. A molded article made of a resin material containing cellulose fibers,
    wherein the molded article has a surface portion that is in a range satisfying $T_F \leq 0.1 \times T$,
        where T is a thickness of the molded article, and
        $T_F$ is a thickness of the surface portion, which is a distance from a surface of the molded article,
    the molded article satisfies $D_F \geq 1.1 \times D$,
        where D is an average cellulose concentration of the overall molded article, and
        $D_F$ is an average cellulose concentration of the surface portion,
    the molded article has a weld line from a junction point of a resin flow during injection molding,
    the molded article has a weld portion that is in a range satisfying $T_W \leq 0.1 \times T$,
        where $T_W$ is the thickness of the weld portion, which is a distance from the weld line,
    the molded article satisfies $D_W \geq 1.1 \times D$,
        where $D_W$ is an average cellulose concentration of the weld portion, and
    the molded article has fiber entanglement portions wherein cellulose fibers partially protruding from both sides of the weld line are entangled with one another.

2. The molded article according to claim 1,
    wherein the molded article is shaped like a cylinder that is annularly closed in cross section,
    the molded article has an outer surface portion that is in a range satisfying $T_{Fout} \leq 0.1 \times T$,
        where $T_{Fout}$ is a thickness of the outer surface portion, which is a distance from an outer surface of the molded article,
    the molded article has an inner surface portion that is in a range satisfying $T_{Fin} \leq 0.1 \times T$,
        where $T_{Fin}$ is a thickness of the inner surface portion, which is a distance from an inner surface of the molded article, and
    the molded article satisfies $D_{Fout} > D_{Fin} \geq 1.1 \times D$,
        where $D_{Fout}$ is an average cellulose concentration of the outer surface portion, and
        $D_{Fin}$ is an average cellulose concentration of the inner surface portion.

3. A molding method for manufacturing the molded article according to claim 1, wherein in a molding die for molding of the molded article,
    a mean temperature of the molding die at completion of charging of the resin material is set lower than a mean temperature of the molding die at start of charging of the resin material.

4. A molding method for manufacturing the molded article according to claim 2, wherein in the molding die, a mean temperature of an inner die in contact with the inner surface portion of the molded article is always set higher than a mean temperature of an outer die in contact with the outer surface portion of the molded article, from start to completion of charging of the resin material.

* * * * *